United States Patent
Kaliski, Jr.

(10) Patent No.: US 10,148,441 B2
(45) Date of Patent: Dec. 4, 2018

(54) SYSTEMS, DEVICES, AND METHODS FOR DETECTING DOUBLE SIGNING IN A ONE-TIME USE SIGNATURE SCHEME

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

( * ) Notice: Subject to any disclaimer, the term of this patent is extended or adjusted under 35 U.S.C. 154(b) by 159 days.

(21) Appl. No.: 14/851,804

(22) Filed: Sep. 11, 2015

(65) Prior Publication Data

US 2016/0080156 A1    Mar. 17, 2016

Related U.S. Application Data

(60) Provisional application No. 62/049,918, filed on Sep. 12, 2014.

(51) Int. Cl.
*H04L 9/32*    (2006.01)

(52) U.S. Cl.
CPC ........ *H04L 9/3247* (2013.01); *H04L 2209/56* (2013.01)

(58) Field of Classification Search
CPC .......................... H04L 9/3247; H04L 2209/56
See application file for complete search history.

(56) References Cited

U.S. PATENT DOCUMENTS

| | | | | |
|---|---|---|---|---|
| 5,432,852 A * | 7/1995 | Leighton | ............... | H04L 9/3236 380/30 |
| 5,872,844 A * | 2/1999 | Yacobi | .................. | G06Q 20/06 705/39 |
| 5,878,138 A * | 3/1999 | Yacobi | .................. | G06Q 20/02 340/5.41 |
| 2002/0116345 A1* | 8/2002 | Harrison | ............... | G06Q 20/04 705/76 |

OTHER PUBLICATIONS

Michael Peirce, Multi-Party Electronic Payments for Mobile Communications, Oct. 31, 2000, University of Dublin, Trinity College, pp. 1-232.*

(Continued)

*Primary Examiner* — Ellen Tran
(74) *Attorney, Agent, or Firm* — Artegis Law Group, LLP

(57) ABSTRACT

Embodiments relate to systems, devices, and computer-implemented methods for detecting double signing in one-time use signature schemes by receiving a first message, where the first message includes a signature generated using a one-time use private key of a one-time use public/private key pair, determining a one-time use public key of the public/private key pair based on the first message, adding the one-time use public key to a list of public keys, receiving a second message, where the second message includes a signature generated using the one-time use private key of the one-time use public/private key pair, determining the one-time use public key of the public/private key pair based on the second message, determining that the one-time use public/private key pair was used more than once based on the list of public keys; and generating an alert based on determining that the one-time use public/private key pair was used more than once.

21 Claims, 4 Drawing Sheets

(56) References Cited

OTHER PUBLICATIONS

ByeongKon Kim a Thesis for the Degree of Master Design of Fair Tracing E-cash System based on Blind Signatures, 2004, School of Engineering in formation and Communications University, pp. 1-54.*

"Fungibility, Privacy & Identity—Adam Back", https//:bitcointalk. org/index.php?topic=509674.0;wap2, Feb. 2014; Retrieved from the internet Sep. 11, 2015, pp. 1-3.

Poettering et al. "Double-authentication-preventing signatures." Jul. 19, 2014, Proceedings of Esorics, 24 pages, https://s3.amazonaws. com/files.douglas.stebila.ca/files/research/papers/ESORICS-PoeSte14-full.pdf.

Ruffing et al., "Liar, liar, coins on fire!: Penalizing equivocation by loss of bitcoins." Proceedings of the 22nd ACM SIGSAC Conference on Computer and Communications Security. ACM, 2015, 14 pages. https://publications.cispa.saarland/565/1/penalizing.pdf.

Derler et al. "Short Double- and N-Times-Authentication-Preventing Signatures from ECDSA and More", IAIK, Graz University of Technology, Austria 2 AIT Austrian Institute of Technology GmbH, Vienna, Austria, 2017, 33 pages.

Tonych, "One-time signatures to prevent double spends", Bitcoin Forum, Jul. 21, 2015, 5 pages. https://bitcointalk.org/index.php?topic=1129388.msg11929339#msg11929339.

Van Saberhagen, Nicolas. "Cryptonote v 2. 0." Oct. 17, 2013, 20 pages. https://cryptonote.org/whitepaper.pdf.

* cited by examiner

SYSTEMS, DEVICES, AND METHODS FOR DETECTING DOUBLE SIGNING IN A ONE-TIME USE SIGNATURE SCHEME

CROSS-REFERENCE TO RELATED APPLICATIONS

This application claims priority to U.S. Provisional Patent Application having Ser. No. 62/049,918, which was filed on Sep. 12, 2014, and is incorporated herein by reference in its entirety.

BACKGROUND

Public key cryptography can be used for secure messaging between a sender and a receiver. The sender can generate or otherwise obtain a public/private key pair, sign a message using the private key, and send the message to the receiver. Using the public key, the receiver can verify that the message was signed using the private key, but is generally unable to reproduce the private key or generate a new signature. Some signature schemes that use public key cryptography can be designated as one-time use signature schemes, in that the receiver's inability to reproduce the private key or generate a new signature is assured only if sender signs one message with its private key, but not necessarily if the sender signs two or more messages.

As an example, public key cryptography can be used in cryptocurrency transactions. In the case of a cryptocurrency transaction, the sender can obtain an address of the receiver, where the address of the receiver is associated with the receiver's account. The sender can generate a public/private key pair that is associated with the sender's account, sign a message that includes the amount of funds to be transferred and the receiver's address, and send the signed message to the receiver (as well as to others in the cryptocurrency network). The receiver can then verify the account of the sender and verify the available funds of the sender based on a transaction log of the cryptocurrency (e.g., a block chain) to determine whether the sender can enter into the transaction.

However, the sender can exploit a vulnerability in cryptocurrency and other systems based on transaction logs. In particular, the sender can clone the one-time use private key and attempt to engage in a second transaction with the same or a second receiver using the cloned private key. Because of network delays, for example, the receiver(s) might not be aware of both transactions before verifying their respective transactions and/or, in the case of a cryptocurrency transaction, the available funds of the sender may not be up to date.

Accordingly, either the first transaction or the second transaction may exhaust the funds in the sender's account and/or only one transaction may be added to the transaction log. As a result, while the receiver(s) may verify both the transactions, only one transaction may result in a payment.

Therefore, there is a need for systems and methods for detecting and responding to double signing in a one-time use signature scheme.

SUMMARY

The present disclosure relates to systems, devices, and methods for detecting double signing in a one-time use signature schemes.

Implementations of the present teachings relate to methods, systems, and computer-readable storage media for detecting double signing in one-time use signature schemes at a monitoring device by receiving a first message, where the first message includes a signature generated using a one-time use private key of a one-time use public/private key pair, determining a one-time use public key of the public/private key pair based on the first message, adding the one-time use public key to a list of public keys, receiving a second message, where the second message includes a signature generated using the one-time use private key of the one-time use public/private key pair, determining the one-time use public key of the public/private key pair based on the second message, determining that the one-time use public/private key pair was used more than once based on the list of public keys; and generating an alert based on determining that the one-time use public/private key pair was used more than once.

In some embodiments, the one-time use public/private key pair can be a hash-based public/private key pair.

In some embodiments, the monitoring device can forge a signature associated with the one-time use private key based on the first message and the second message. In further embodiments, the monitoring device can forge the signature automatically in response to the alert.

In some embodiments, the first message and the second message can be associated with a cryptocurrency. In further embodiments, the monitoring device can initiate a transfer of funds from an account of the sender of the first message or the sender of the second message using the forged signature. In still further embodiments, the funds can be automatically transferred in response to the signature being successfully forged.

In some embodiments, the monitoring device can have an instance of a transaction database stored thereon. In further embodiments, the monitoring device can maintain a separate transaction database for recording transactions observed by the monitoring device.

In some embodiments, the monitoring device can transmit the alert to a mobile device, where the mobile device activates a monitoring application on the mobile device in response to the alert to cause the mobile device to play an alert audio file, turn on the screen of the mobile device, or vibrate in response to the alert.

In some embodiments, the public/private key pair can be associated with a Lamport signature scheme, a generalized Bos-Chaum signature scheme, a Lamport-Diffie-Winternitz signature scheme, a generalized Bos-Chaum-Winternitz signature scheme, or an RSA-based one-time use signature scheme.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
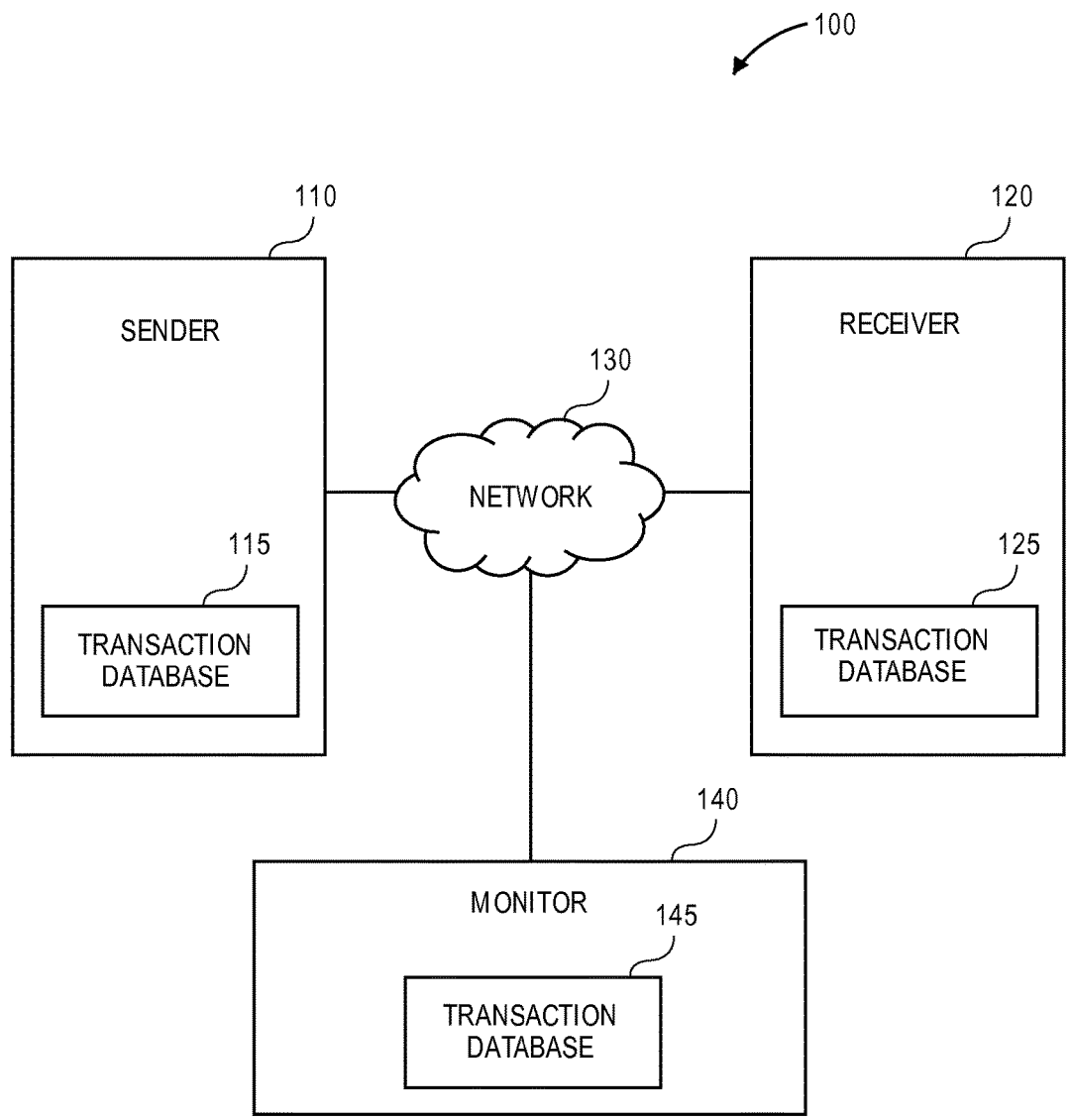
FIG. 1 is a diagram depicting an example of a secure messaging system, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an example of a secure messaging system, consistent with certain disclosed embodiments. In particular, FIG. 1 depicts a secure messaging system 100 that includes a sender 110 with a transaction database instance 115, a receiver 120 with a transaction database instance 125, and a monitor 140 with a transaction database instance 145. Sender 110, receiver 120, and monitor 140 can communicate via, for example, network 130.

In various embodiments, sender 110 can be an entity or device that desires to initiate a secure transaction with a receiver (e.g., receiver 120). Sender 110 can represent any type of computing device capable of maintaining and updating an instance of a distributed transaction database and transmitting messages signed using digital signatures, such as, for example, secure messages or cryptocurrency transactions. In a messaging system, for example, sender 110 can represent a message sender. In a cryptocurrency system, for example, sender 110 can represent a buyer. In some embodiments, sender 110 can represent a user device, such as, for example, a desktop computer, a laptop, a tablet device, or a mobile device (e.g., a smartphone).

In various embodiments, receiver 120 can be an entity or device that is the recipient of a secure transaction from a sender (e.g., sender 110). Receiver 120 can represent any type of computing device capable of maintaining and updating an instance of a distributed transaction database and verifying transmitted messages signed using digital signatures, such as, for example, secure messages or cryptocurrency transactions. In a messaging system, for example, receiver 120 can represent a message recipient. In a cryptocurrency system, for example, receiver 120 can represent a seller. In some embodiments, receiver 120 can represent a user device, such as, for example, a desktop computer, a laptop, a tablet device, or a mobile device (e.g., a smartphone).

In various embodiments, monitor 140 can be an entity or device that monitors secure transactions in a secure messaging system between senders (e.g., sender 110) and receivers (e.g., receiver 120). Monitor 140 can represent any type of computing device capable of maintaining and updating an instance of a distributed transaction database and determining whether a one-time use private key was used to sign multiple transmitted messages, such as, for example, secure messages or cryptocurrency transactions. In a messaging system, for example, monitor 140 can represent a message recipient or a third-party to the transaction. In a cryptocurrency system, for example, monitor 140 can represent a seller or a third-party to the payment (e.g., a cryptocurrency miner and/or power user). In some embodiments, monitor 140 can represent a user device, such as, for example, a desktop computer, a laptop, a tablet device, or a mobile device (e.g., a smartphone).

In some embodiments, transaction database instance 115, transaction database instance 125, and transaction database instance 145 can represent instances in a distributed database implemented on multiple computers that maintains a log of transactions. In some implementations, the transaction database instances 115, 125, and 145 can be updated based on broadcasted or multicasted transactions from receivers or other parties. For example, transaction database instance 115, transaction database instance 125, and transaction database instance 145 can be a cryptocurrency block chain database that maintains a continuously growing log of cryptocurrency transactions that are not subject to tampering and revision. In some embodiments, instances of the distributed transaction database can be implemented on sender 110, receiver 120, monitor 140, a combination thereof, or on other devices in the secure messaging system. In further embodiments, monitor 140 can maintain a separate database that records transactions observed by the monitor separate from their appearance on the distributed database.

In some embodiments, network 230 can represent any type of communication network capable of transmitting messages between devices. In some implementations, network 230 can include, for example, one or more local area networks and/or one or more wide area networks (e.g., the Internet, telecommunications networks, etc.).

In some embodiments, sender 110 can be a malicious user that is attempting to send multiple messages signed using a single one-time use private key. In some embodiments, sender 110 can represent two or more devices that are collaborating together to attempt to send multiple messages signed using a single one-time use private key (e.g., the private key is cloned at a first sender and sent to a second sender to use).

In some embodiments, sender 110 can transmit a cloned version of the one-time use private key to a second sender to attempt to disguise the use of the same one-time use private key in multiple messages. In further embodiments, sender 110 and/or sender 110 and the second sender can attempt to transmit messages to multiple receivers to disguise the use of the same one-time use private key in multiple messages.

In some embodiments, sender 110 can represent a device controlled by receiver 120 that is being used by a buyer. For example, sender 110 can be a vending machine that allows for payment via cryptocurrency. The vending machine can display a barcode (e.g., a Quick Response (QR) code) with its cryptocurrency address and payment amount. To make a purchase, the buyer can scan the barcode and sign the transaction using a one-time use private key, transferring value to the address of receiver 120. In some embodiments, the buyer can be a malicious buyer that is attempting to send multiple messages signed using a single one-time use private key to force the vending machine to dispense multiple products, even if the buyer does not have sufficient funds for all the purchased products. In other embodiments, another buyer using the same account and one-time use private key can make a similar purchase at another vending machine in a different location. Accordingly, due to the double signing, the vending machine may only be able to receive payment for one transaction or only one of the vending machines may receive payment. In such an embodiment, the account of sender 110, as used herein, refers to an account of the buyer.

In a messaging system, sender 110 can represent a spammer. In some embodiments, sender 110 can be attempting to send multiple email messages signed using a single one-time use private key. For example, sender 110 may have been assigned a one-time use private key at regular intervals (e.g., one minute) to limit the number of messages that can be sent under a given one-time use public/private key pair (e.g., to prevent spamming, or as a method of rate-limiting signatures). Alternatively or in addition, the one-time use private key can be associated with a postage paid by sender 110, where the postage is paid via a cryptocurrency transaction, and sender 110 may be attempting to send multiple messages without paying the appropriate postage. However, as discussed in detail below, double-signing within an interval runs the risk of forgery producing a valid signed message not originated by sender 110, which could thus affect sender 110's reputation. Forgery can thus serve as a deterrent to spamming, either by resulting in unexpected payments by the sender or unexpected messages carrying the sender's signature.

In the case of a cryptocurrency transaction, sender 110 can be a buyer in the cryptocurrency transaction. Sender 110 can generate or otherwise obtain a one-time use public/private key pair and sender 110 can attempt to transmit two cryptocurrency transactions to receiver 120 using the same one-time use private key. Receiver 120 may allow both transactions after confirming that the cryptocurrency transactions were validity created using the one-time use private key (i.e., verify using the one-time use public key) and confirming that sender 110 has an adequate balance for the transaction using the instance of the block chain database of the cryptocurrency located on receiver 120 (i.e., transaction database 125). However, in some embodiments, because both cryptocurrency transactions were signed using the one-time use private key, only one of the two transactions can be added to the block chain and/or sender 110 may only have an adequate balance for the individual transactions but not both. Accordingly, because receiver 120 did not verify that the first of the cryptocurrency transactions was added to the block chain prior to allowing the transaction, receiver 120 may not be able to add both transactions to the block chain and may only receive payment for one transaction.

In various embodiments, sender 110 can be a malicious sender attempting to double sign using a one-time use signature scheme. In some embodiments, the malicious sender can attempt to double sign a hash-based one-time use public/private key pair based on, for example, a Lamport signature scheme, a generalized Bos-Chaum signature scheme, a Lamport-Diffie-Winternitz signature scheme, a generalized Bos-Chaum-Winternitz signature scheme, or other hash-based signature schemes. In other embodiments, the malicious sender can attempt to double sign with a one-time use public/private key pair based on an RSA-based one-time use signature scheme, or other one-time use signature schemes.

In some embodiments, receiver 120 can be a victim of a malicious user that is attempting to send multiple messages signed using a one-time use private key. In other embodiments, receiver 120 can represent two or more devices that are victims of an attempt to send multiple messages signed using a one-time use private key (e.g., a first message signed using a private key is sent to a first receiver and a second message signed using the private key is sent to a second receiver).

In some implementations, monitor 140 can monitor the secure messaging system for two or more messages signed using the same one-time use private key. For example, monitor 140 can maintain a list of one-time use public keys that have been used in a transaction and store previous signatures associated with the public keys (e.g., as a transaction database separate from transaction database instance 145). Once a public key in the list is associated with a new transaction, monitor 140 can determine that a double signing has occurred. Using only a single signature, monitor 140 may not be able to forge a new signature associated with the one-time use private key as forging the new signature can require a large and potentially unmanageable forgery effort (e.g., amount of time and/or processing capabilities). However, using the two or more signatures signed using the same one-time use private key, the forgery effort required by monitor 140 can be substantially reduced.

In some embodiments, once monitor 140 has successful forged a signature associated with a one-time use private key, monitor 140 can use the forged signature to create a new transaction that, for example, is associated with sender 110 (based on the private key) and transfers funds from an account of sender 110 and/or otherwise interferes with the account of sender 110 or penalizes sender 110.

In some implementations, monitor 140 can represent two or more devices that are monitoring for two or more messages signed using a one-time use private key.

In various embodiments, in order to facilitate forgery of double-signed one-time use private keys, receiver 120 can require that sender 110 provide a message that is signed using a particular signature scheme, such as, for example, a Lamport signature scheme, a generalized Bos-Chaum signature scheme, a Lamport-Diffie-Winternitz signature scheme, etc. These schemes have parameters, of which examples are given below. In some embodiments, it can be beneficial to choose parameters that ensure that signature forgery is at a high level of difficulty when only one message is signed (e.g., 128-bit security), and at a relatively low level when two or more messages are signed (e.g., 40-bit security).

In some implementations, the one-time use signature scheme can be combined with a Merkle hash tree construction so that a single overall public key can represent multiple underlying one-time use public keys. In some embodiments, the one-time use private keys can likewise be derived from a single overall private key. In such implementations, an individual signature may be associated with context information and/or an index value that specifies which underlying one-time use public/private key pair is involved in a signature. For example, in a cryptocurrency system, the context information may comprise a transaction number or identifier, so that multiple transactions can be associated with the same overall public key (e.g., from which a cryptocurrency address may be derived), yet each one signed with a separate underlying private key. In an email system, the context information may comprise the current time interval, e.g., each underlying one-time use key pair in the Merkle tree is associated with a different time interval. The context information may also be part of the signature itself, e.g., the counter may be included in the signature or transaction. Receiver 120 can check that the context information in the signature or transaction it receives from the sender is the correct "next" value based on the previous transaction of sender 110 in the transaction log. In further embodiments, receiver 120 can require that sender 110 provide a message that complies with selected constraints and/or complies with selected parameters for the selected signature scheme.

In some embodiments, receiver 120 can require that sender 110 provide a message that is signed using a selected list of one or more signature schemes that include a Lamport signature scheme. In a Lamport signature scheme, the private key is n pairs of random values $(x_{10}, x_{11}), \ldots, (x_{n0}, x_{n1})$ and the public key is n corresponding pairs $(y_{10}, y_{11}), \ldots, (y_{n0}, y_{n1})$ created using a one-way function $f$ where $y_{ij} = f(x_{ij})$ for all i, j. To sign a message, the message is hashed using an n-bit hash function into an n-bit hash value. Then, for each bit in the hash sum, one value is selected from the corresponding pairs of numbers that make up the private key. This produces a sequence of n values. These values are the signature that can be transmitted along with the message. To verify the signature the message is again hashed using the n-bit hash function into an n-bit hash value. The bits in the hash sum are used to pick out n of the public key values, similar to how the values are selected from the private key for the signature. The n values in the signature are then each input into the one-way function giving n output values. If the n output values exactly match the n values picked out from the public key then the signature is verified. If not, then the signature is not verified.

Accordingly, parameters that affect the security and forgeability of signatures created using a Lamport signature scheme include the value n, the n-bit hash function, and the one-way function $f$. In some embodiments, receiver 120 can specify parameters of the generalized Lamport signature scheme, and require that the signature scheme used by sender 110 comply with the specified parameters (e.g., that the parameters are an exact match, are within a specified range, etc.). For example, the parameter values can be n=256, where the hash function and the one-way function are both Secure Hash Algorithm (SHA)-256.

In some embodiments, the Lamport signature scheme can be combined with a Merkle hash tree construction to represent multiple underlying one-time use public keys with a single overall public key.

In some embodiments, the receiver 120 can require that sender 110 provide a message that is signed using a selected list of one or more signature schemes that include a generalized Bos-Chaum signature scheme. In a generalized Bos-Chaum signature scheme, the private key is n random values $x_1, \ldots, x_n$ and the public key is n corresponding values $y_1, \ldots, y_n$ created using a one-way function $f$ where $y_i = f(x_i)$ for all i. To sign a message, the message is hashed using a hash function into a hash value between 0 and $$\binom{n}{k} - 1,$$

where $$\binom{n}{k}$$

is the number of subsets of size k in a set of size n. Then, a subset of size k of the private key values is selected based on the hash value (the particular subset can be determined based on conventional combinational methods). This subset of the private key values is the signature that can be transmitted along with the message. To verify the signature, the message is again hashed into a hash value using the hash function. A subset of size k of the public key values is selected based on the hash value. The k values in the signature are each input to the one-way function giving k output values. If the k output values exactly match the subset of the public key values then the signature is verified. If not, then the signature is not verified.

Accordingly, parameters that affect the security and forgeability of signatures created using a generalized Bos-Chaum signature scheme include the value n, the subset size k, the hash function, and the one-way function $f$. For example, the parameter values can be n=512 and k=454, where the hash function is based on SHA-256 and maps to the range $$\left[0, \binom{512}{454} - 1\right],$$

and the one-way function is SHA-256. In some embodiments, the range can be slightly larger than the output of SHA-256. An implementation can therefore compute two separate hashes with SHA-256 and slightly different inputs, consider them together as an integer in the range $[0, 2^{512}-1]$, and then reduce the integer modulo $$\binom{512}{454}$$

to get to the desired range.

In some embodiments, the generalized Bos-Chaum signature scheme can be combined with a Merkle hash tree construction to represent multiple one-time use public keys with a single overall public key.

In some embodiments, the receiver 120 can require that sender 110 provide a message that is signed using a selected list of one or more signature schemes that include a Lamport-Diffie-Winternitz signature scheme. In a Lamport-Diffie-Winternitz signature scheme, the private key is n+c random values $x_1, \ldots, x_{n+c}$ where c is the length of the largest possible checksum and the public key is the hash of n+c corresponding values $y_1, \ldots, y_{n+c}$ created using the (d−1)-st iterate of a one-way function $f$, where $y_i = f^{d-1}(x_i)$ for all i, and d is the depth of a hash chain. To sign a message, the message is hashed using a hash function into an n-digit hash value $h_1, \ldots, h_n$ with digits in base d. Then, a checksum is computed using the formula $$checksum = n(d-1) - \sum_{i=1}^{n} h_i$$

The checksum is then represented as the digits $h_{n+1}, \ldots, h_{n+c}$ in base d. The signature is the $(h_i)$-th iterates of the private key values, i.e., $s_i = (h_i)$-th iterate off on $x_i$. The n+c resulting values make up the signature that can be transmitted along with the message. To verify the signature, the message is again hashed into an n-digit hash value in base d and a checksum is computed using the formula above. The signature values are each input into the one-way function, respectively iterated $(d-1-h_i)$ times, giving n+c output values. The output values are then hashed. If the hash matches the public key, then the signature is verified. If not, then the signature is not verified.

Accordingly, parameters that affect the security and forgeability of signatures created using a Lamport-Diffie-Winternitz signature scheme include the value n, the number of checksum digits c, the depth of the hash chain d, the hash function for computing the public key, the hash function mapping to an n-digit value in base d, and the one-way function $f$. In some embodiments, receiver 120 can specify parameters of the Lamport-Diffie-Winternitz signature scheme, and require that the signature scheme used by sender 110 comply with the specified parameters (e.g., that the parameters are an exact match, are within a specified range, etc.). For example, the parameters can be n=32 and d=256, where the hash functions and the one-way function are all SHA-256, and the number of checksum digits is c=2.

In some embodiments, the generalized Lamport-Diffie-Winternitz signature scheme can be combined with a Merkle hash tree construction to represent multiple one-time use public keys with a single overall public key.

In some embodiments, the receiver 120 can require that sender 110 provide a message that is signed using a selected list of one or more signature schemes that include a signature scheme that combines the Winternitz hash chain with the generalized Bos-Chaum signature scheme (hereinafter, "a generalized Bos-Chaum-Winternitz signature scheme," also generally referred to as a "rake" scheme). In a generalized Bos-Chaum-Winternitz signature scheme, the private key is n random values $x_1, \ldots, x_n$ and the public key is the hash of n corresponding values $y_1, \ldots, y_{n+c}$ created using the $(d-1)$-st iterate of a one-way function $f$, where $y_i = f^{d-1}(x_i)$ for all i, and d is the depth of a hash chain. To sign a message, the message is hashed using a hash function into a hash value between 1 and u, where u is the number of ways to decompose a parameter v into n digits each in the range $[0, d-1]$ (i.e., the number of such compositions of v). Then, a composition $a_1, \ldots, a_n$ is selected based on the hash value (the particular composition can be determined based on conventional combinational methods). The signature is the $(a_i)$-th iterates of the private key values, i.e., $s_i = (a_i)$-th iterate of $f$ on $x_i$. The n resulting values make up the signature that can be transmitted along with the message. To verify the signature, the message is again hashed into a composition $a_1, \ldots, a_n$. The signature values are each input to the one-way function, respectively iterated $(d-1-a_i)$ times, giving n output values. The output values are then hashed. If the hash matches the public key, then the signature is verified. If not, then the signature is not verified.

Accordingly, parameters that affect the security and forgeability of signatures created using a generalized Bos-Chaum-Winternitz signature scheme include the value n, the depth of the hash chain d, the sum of digits parameter v, the hash function for computing the public key, the hash function to [1, u], and the one-way function $f$. In some embodiments, receiver 120 can specify parameters of the Bos-Chaum-Winternitz signature scheme, and require that the signature scheme used by sender 110 comply with the specified parameters (e.g., that the parameters are an exact match, are within a specified range, etc.). For example, the parameters can be n=32, d=512, and v=3840, where the hash functions and the one-way functions are all SHA-256 or based on SHA-256.

In some embodiments, the generalized Bos-Chaum-Winternitz signature scheme can be combined with a Merkle hash tree construction to represent multiple one-time use public keys with a single overall public key.

One-time use signature schemes based on hash functions such as those described above may be used in some embodiments because they can be constructed only with hash functions, as opposed to other signature schemes such as a Rivest, Shamir, Adleman scheme (RSA) that also involve various mathematical operations. Another advantage is that such schemes are "quantum-safe." In other words, they can resist cryptanalysis by a hypothetical future quantum computer. Accordingly, cryptocurrency and other systems can benefit from hash-function-based signature schemes. In particular, such systems can benefit from hash-function-based signature schemes with double-signing detection and protection, as described herein.

It is possible to obtain similar benefits from a variant of the RSA signature scheme. Like the schemes described above when combined with Merkle trees, the RSA scheme has a single overall public key and private key, and multiple intermediate components that each are intended for one-time use. The components may be indexed with a context w and a time epoch t. In contrast to Merkle-tree signatures, however, the number of intermediate components is effectively unlimited; both w and t can be arbitrarily large.

In the RSA-based scheme, if the signer makes two signatures with the same context and time epoch, then a forger will be able to produce additional signatures with the same context and time epoch. The signer can make multiple signatures with different contexts, or with the same context and different time epochs, without risk of forgery.

The signer has an ordinary RSA public/private key pair. The public key can be an RSA modulus n and public exponent e, and the private key can be an RSA modulus n and the corresponding private exponent d, although other representations are possible.

For example, let $f$ and $g$ be separate one-way functions on one and two inputs respectively that map to the range $[0, n-1]$, and let H be a hash function.

To sign a message m in context w and epoch t, the signer computes $s = u \, v^c \bmod n$ where $u = f(w)^d \bmod n$ and $v = g(w,t)^d \bmod n$, and $c = H(m, f(w))$. The signature includes s. To verify the signature, the verifier computes $s^e \bmod n$ and $f(w) g(w,t)^c \bmod n$ where $c = H(m, f(w))$ and compares whether they are equal. If so, the signature is verified, and if not, the signature is not verified.

The signature scheme may be considered a variant of a Guillou-Quisquater (GQ) scheme where the signer maintains both the "system" key pair (the RSA key pair) and the "user" key pair (public=$f(w)$, private=$f(w)^d$). The "commitment" is constructed in this scheme in the reverse of the usual way, i.e., instead of the signer generating a random value and raising it to the public exponent, the signer starts with the commitment, here $g(w,t)$, and raises it to the private exponent to get the "random" value. This is possible because the signer retains the system key pair. The commitment is thus bound to the context and the epoch. The "user" key pair is bound only to the context. The "challenge" c is derived from the message and the commitment in the usual way for non-interactive zero-knowledge type signatures, and the rest of the signature is the standard "response" to the challenge.

Because of the way the challenge is computed, the successful signer (a party who can produce valid signatures) may not know the challenge or response before making the commitment, so the signer must be prepared to answer any challenge. The signer must therefore be able to give $s_1$ and $s_2$ in response to arbitrary $c_1$ and $c_2$ to satisfy: $s_1^e = f(w) g(w,t)^{c_1} \bmod n$ and $s_2^e = f(w) g(w,t)^{c_2} \bmod n$. Dividing this means a successful signer can be made to compute (i.e., the signer "knows") a value $z = (s_1/s_2) \bmod n$ such that: $z^e = g(w, t)^{c_1-c_2} \bmod n$ or equivalently the value z such that $z = v^{c_1-c_2} \bmod n$. The signer also knows $g(w,t) = v^e \bmod n$. If $c_1 - c_2$ is relatively prime to e, the two exponentials of v that the signer knows have relatively prime exponents and therefore the signer can also compute v. It follows that the signer also knows u, the user private key.

If the signer signs two messages with the same context and time epoch, the signer will reveal both $s_1$ and $s_2$, and monitor 140 will be able to solve for v and u. Given this information monitor 140 or another party may be able to forge a signature on another message with the same (context, epoch) combination.

The ability to forge signatures for one (context, epoch) combination may not imply the ability to forge for another combination because the system (RSA) private key remains unknown. Also, once the signer has cheated once and the u and v values are revealed, if the signer generates even a single additional signature with the same context w, the forger will again be able to forge an additional signature for that new (context, epoch) combination, because u only depends on w. Put another way, signing twice with the same context puts every signature associated with that context at risk of forgery.

If u was derived from both w and t, however, then the span of this additional penalty would be limited to the particular (context, epoch) combination.

However, if u were "generic" (e.g., derived from a fixed value independent of w and t) then the span of the second penalty would be unlimited. Every further signature made with the private key would be at risk of forgery if even one double-signing occurred.

In further embodiments, receiver 120 can require that the message sent by sender 110 contain an exact value requested by the receiver or that all fields, scripts, etc. be constrained to a small set of acceptable values. This can make it more difficult for sender 110 to choose multiple messages in an attempt to find two that have a small volume and thus require monitor 140 to perform a larger forgery effort, as described above. In other implementations receiver 120 can vary its transaction address. Accordingly, sender 110 would be unable to pre-generate the possible messages that would be favorable in terms of forgery effort. In addition, sender 110 may not have time to send its message to a collaborating sender so the collaborating sender may not know whether its own message will result in a large forgery effort or not. In other embodiments, receiver 120 can require that an address of sender 110 must receive any unspent funds (i.e., change) during a transaction as a further constraint.

In further implementations, receiver 120 can require that the input into creating the signature not include random non-message data, which could be used by sender 110 to prevent forgery when double signing.

In still further embodiments, receiver 120 can require that sender 110 maintain a balance amount greater than a selected multiple of the transaction value (e.g., two times, three times, etc.). Accordingly, receiver 120 may be fully reimbursed when double signing occurs, but not necessarily triple signing, quadruple signing, etc.

In further implementations, receiver 120 can require that the sender 110 provide two or more signatures, to increase the probability that double signing will result in forgery for at least one of the signatures. Thus, if the signature scheme follows a standard where parameters are not necessarily selected to result in a desired forgery effort, double signing can still result in forgery because the combination of two or more signatures can facilitate such an effort.

The schematic depicted in FIG. 1 is merely for the purpose of illustration and is not intended to be limiting. Further, the secure messaging system depicted is merely a simplified example of a secure messaging system, consistent with certain disclosed embodiments, but such an example is not intended to be limiting.

Figure 2:
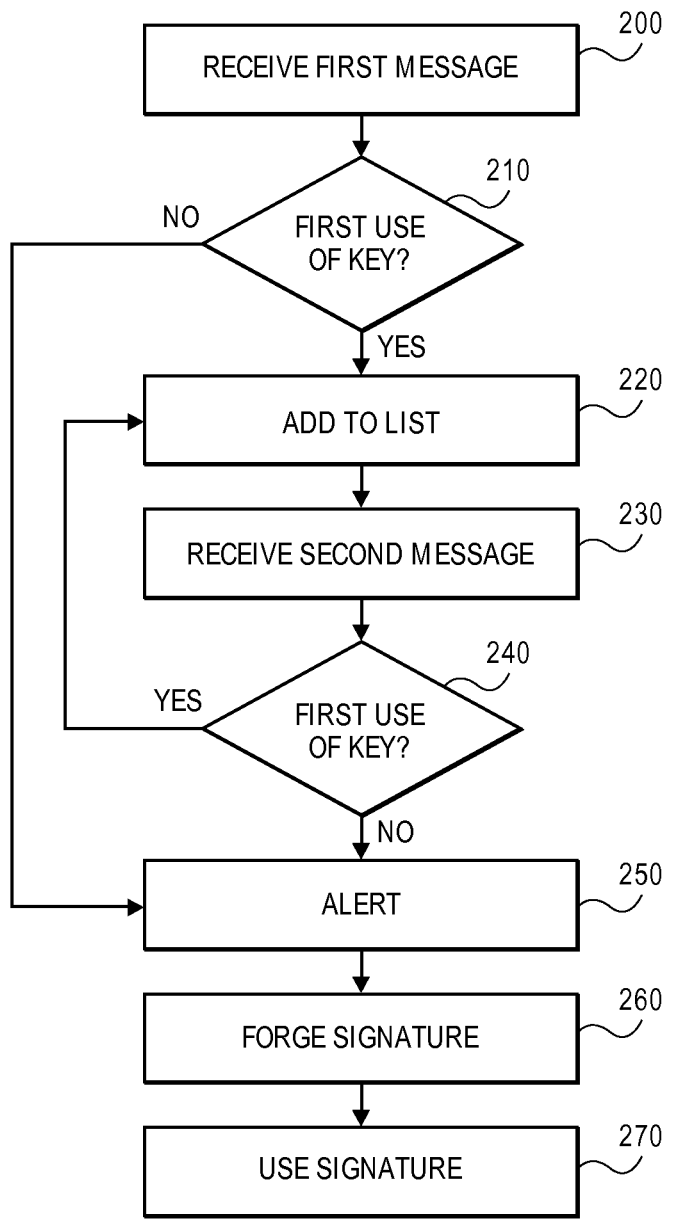
FIG. 2 is a flow diagram illustrating an example method for detecting double signing in one-time use signature schemes, consistent with certain disclosed embodiments.

FIG. 2 is a flow diagram illustrating an example method for detecting double signing in one-time use signature schemes, consistent with certain disclosed embodiments.

The method described in FIG. 2 can be performed using a computing device such as, for example, monitor 140 in FIG. 1.

The process can begin in 200, when monitor 140 receives a first message signed using a one-time use private key. For example, the first message can be a cryptocurrency transaction from a buyer. As an additional example, the first message can be an electronic message, such as an email.

In 210, monitor 140 can retrieve the one-time use public key for the first message and determine if the one-time use public key has been previously used. For example, monitor 140 can maintain a list of one-time use public keys that have been previously used (e.g., as a transaction database separate from transaction database instance 145). Accordingly, if there is a delay in the appearance of a transaction on the distributed database, which is a reason that receiver 120 may not be aware that a double-signing has occurred, monitor 140 can still detect the double signing.

If, in 210, the one-time use public key for the first message is not in the list, monitor 140 can proceed to 220 and, in some embodiments, add the one-time use public key for the first message to the list. If, in 210, the one-time use public key for the first message is in the list, monitor 140 can proceed to 250.

After the one-time use public key for the first message is added to the list in 220, monitor 140 can proceed to 230 when a second message signed using a one-time use private key is received.

In 240, monitor 140 can retrieve a one-time use public key for the second message and determine if the one-time use public key has been previously used. If, in 240, the one-time use public key for second message is not in the list, monitor 140 can proceed to 220 and add the one-time use public key for the second message to the list. If, in 240, the one-time use public key for the second message is in the list (e.g., added in 220 if the one-time use public key for the first message is the same as the one-time use public key for the second message), monitor 140 can proceed to 250.

In 250, in some embodiments, monitor 140 can trigger an alert that a one-time use public/private key pair was used multiple times. In some implementations, monitor 140 can alert a user of monitor 140 by displaying a pop-up message on monitor 140, by sending an alert to a mobile device of the user, by sending an email to the user, etc. For example, sending the alert to a mobile device can activate a monitoring application on the mobile device to cause the mobile device to play an alert audio file, to automatically turn on the screen, and/or to vibrate in response to the alert. As an additional example, monitor 140 can transmit a message to a central monitoring service.

In 260, in some embodiments, monitor 140 can automatically attempt to forge the signature in response to the alert and/or the determination that the one-time use public/private key pair was used multiple times. In other embodiments, the user of monitor 140 can use monitor 140 to attempt to forge the signature in response to the alert.

In some embodiments, if the Lamport signature scheme was used, to forge the signature, monitor 140 can attempt to find a new message where each bit of hash matches a respective bit in either of the two received messages. The difficulty of finding the new message depends on the volume V of information revealed by hashes of the two messages (i.e., the number of hashes that match respective bits of at least one of the messages). If there is a full collision (i.e., the hashes of the two messages are the same) then that volume is 1. If there is an r-near collision (the hashes match in all but at most r bits) then the volume is $V \leq 2^r$. If the forger tries finding messages until one has a hash that falls in the volume revealed, the probability of success per try equals the ratio between the volume V and the number of possible hash values, $2^n$. Accordingly, the forgery effort is $E=2^n/V \geq 2^{n-r}$, and the fewer bits that collide, the less effort is required to forge the signature.

For the Lamport scheme, the example parameters with n=256 are suitable for a 128-bit security level against hash function collisions and other conventional attacks. For two random or arbitrarily selected messages, r will be around n/2. For the example n, therefore, the forgery effort will be around $2^{128}$, which can be higher than forgery effort for other schemes, described below.

In some embodiments, if the generalized Bos-Chaum signature scheme was used, to forge the signature, monitor 140 can attempt to find a new message with a selected subset that is contained within a union of subsets for the two messages. The difficulty of finding the new message depends on the volume V of information revealed by hashes of the two messages (i.e., the number subsets of size k in the union of the subsets for the two messages). If there is a full collision (i.e., the subsets for the two messages are the same) then that volume is 1. If there is an r-near collision (the subsets match in all but at most r positions) then the volume is $$V \leq \binom{k+r}{k}.$$

Accordingly, based on the ratio between the number of hashes and the volume, the forgery effort is $$E = \binom{n}{k} \bigg/ V \geq \binom{n}{k} \bigg/ \binom{k+r}{k},$$

and the fewer positions that match, the less effort is required to forge the signature.

For the generalized Bos-Chaum scheme, the example parameters with n=512 and k=454 are suitable for a 128-bit security level against hash function collisions and other conventional attacks. For two random or arbitrarily selected messages, the forgery effort will be less than $2^{40}$, which is low, with probability about 99%, and less than $2^{30}$, which is very low, with probability about 90%. This particular scheme and parameters will therefore generally be suitable as a deterrent to double-signing, provided that the signer has a limited choice of messages. If the signer has many choices, then the signer can readily find two messages that have only a small volume of information, and hence a higher forgery effort. However, if the signer is constrained, the volume will be higher and the effort lower.

In some embodiments, if the Lamport-Diffie-Winternitz signature scheme was used, to forge the signature, monitor 140 can attempt to find a new message where the hash and checksum digits are each greater than or equal to the lesser of the respective digits from the two messages. The difficulty of finding the new message again depends on the volume V of information revealed, which in this case is the sum of the number of compositions of integers of the form $n(d-1)-\Sigma_{i=1}^{n}\overline{h}_i - v^*$ into digits in ranges $[0, d-1-\overline{h}_1] \ldots [0, d-1-\overline{h}_n]$, over all candidate checksums $v^*$ in the range $[0, n(d-1)-\Sigma_{i=1}^{n}\overline{h}_i]$ where $\overline{h}_1, \ldots, \overline{h}_n$ each are the smaller of the respective hash digits for m, m'. A candidate checksum is one where each digit of the checksum is greater than or equal to the smaller of the respective checksum digits for m, m'. Accordingly, the forgery effort is $E=d^n/V$. Similar to the above described schemes, the greater the volume (i.e., the more the respective hash and/or checksum digits differ) the less effort is required to forge the signature.

For the Lamport-Diffie-Winternitz scheme, the example parameters with n=32, d=256, and c=2 are suitable for a 128-bit security level against hash function collisions and other conventional attacks. For two random or arbitrarily selected messages, the forgery effort will be less than $2^{50}$, which is moderate, with probability about 99%, and less than $2^{44}$, which is moderate to low, with probability about 90%. This particular scheme and parameters will therefore again generally be suitable as a deterrent to double-signing, provided that the signer has a limited choice of messages.

In some embodiments, if the generalized Bos-Chaum-Winternitz signature scheme was used, to forge the signature, monitor 140 can attempt to find a new message with selected digits that are each greater than or equal to the lesser of the corresponding digits of the received messages. The difficulty of finding the new message depends on the volume V of information revealed. The volume equals the number of compositions of $v-\Sigma_{i=1}^{n}\overline{a}_i$ into digits in the ranges $[0, d-1-\overline{a}_1] \ldots [0, d-1-\overline{a}_n]$, where $\overline{a}_1, \ldots, \overline{a}_n$ represent the lesser of the corresponding digits for the two messages, and where v is the scheme parameter. Accordingly, the forgery effort is E=u/V where u is the number of compositions as defined above.

For the generalized Bos-Chaum-Winternitz scheme, the example parameters with n=32, d=256, and v=3840 are suitable for a 128-bit security level against hash function collisions and other conventional attacks. For two random or arbitrarily selected messages, the forgery effort will be less than $2^{46}$, which is moderate to low, with probability about 99%, and less than $2^{40}$, which is low, with probability about 89%. This particular scheme and parameters will therefore again generally be suitable as a deterrent to double-signing, provided that the signer has a limited choice of messages.

Once the signature is forged, monitor 140 can use the forged signature in 270 to, for example, enter a new transaction in the block chain (for a cryptocurrency) to transfer funds away from and/or deplete an account of sender 110. In other embodiments, monitor 140 (e.g., a miner) can put both transactions on the block chain with an indication that they are to interpreted such that both transactions result in payment and any overpayment goes to monitor 140. In other embodiments, monitor 140 can transmit the forged signature to the central monitoring service. In further embodiments, the central monitor service can, for example, put a hold on an account of sender 110 using the forged signature, ban the account of sender 110, transmit a reward to monitor 140 for transmitting the forged signature, etc. Thus, due to the repercussions of having a signature forged, sender 110 may not attempt to double sign using a one-time use public/private key.

While the steps depicted in FIG. 2 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
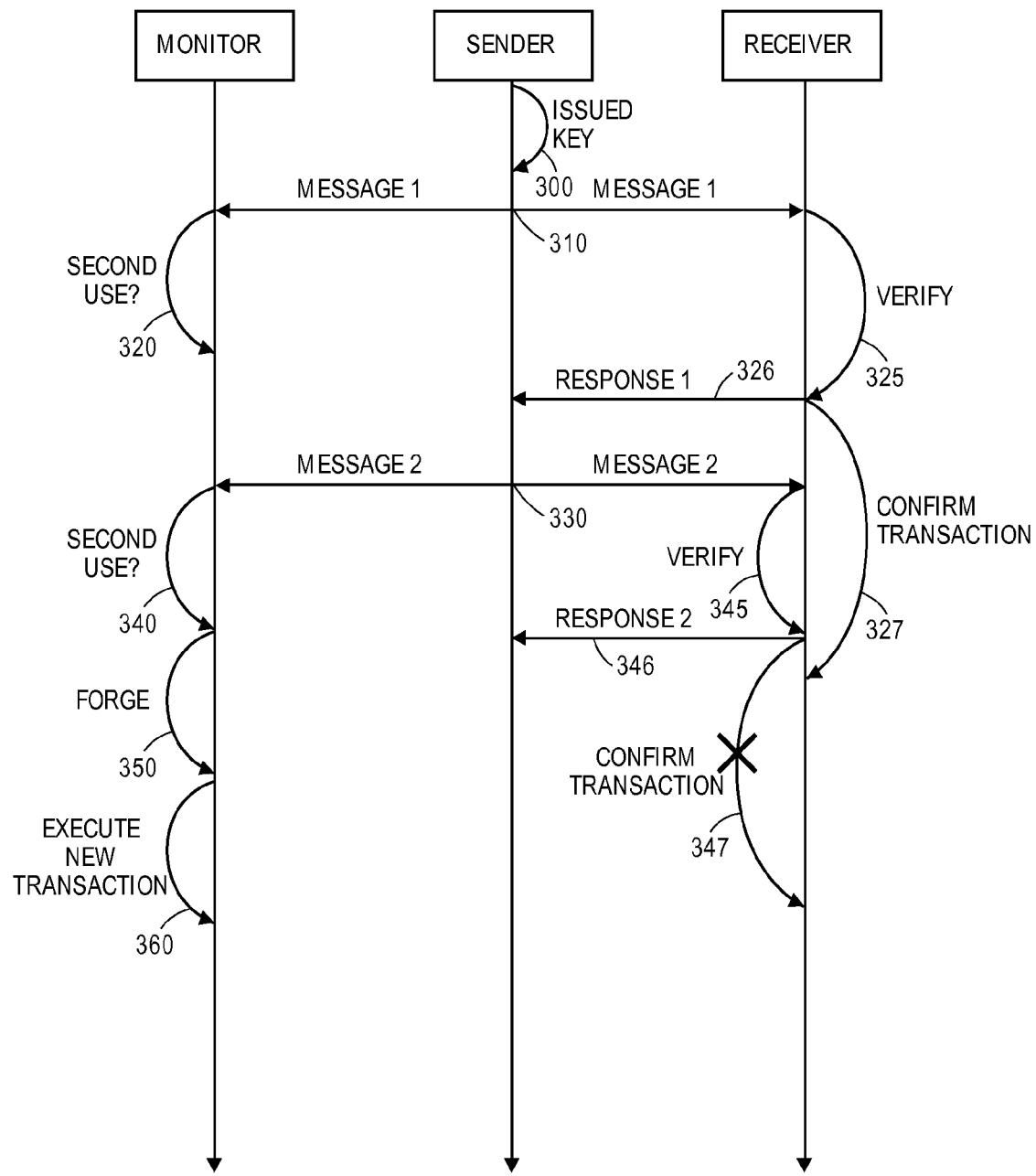
FIG. 3 is an illustration of an example process performed by a sender, receiver, and monitor where the sender is attempting to double sign using a one-time use public/private key pair, consistent with certain disclosed embodiments.

FIG. 3 is an illustration of an example process performed by a sender, receiver, and monitor where the sender is attempting to double sign using a one-time use public/private key pair, consistent with certain disclosed embodiments. The example process can be performed by sender 110, receiver 120, and monitor 140 in FIG. 1. Accordingly, for the purposes of example, reference is made to the entities depicted in FIG. 1.

In 300, sender 110 can generate or otherwise obtain a one-time use public/private key pair. The public key can be broadcast to all participants in the messaging system and/or to all participants that maintain an instance of a transaction log, and the public key can be associated with an account of sender 110. Sender 110 can store the private key.

In 310, sender 110 can enter into a transaction with receiver 120 (e.g. a purchase using a cryptocurrency), sign a first message corresponding to the transaction using the private key, and broadcast the signed message to all participants that maintain an instance of the transaction log (e.g. receiver 120 and monitor 140).

In 320, monitor 140 can determine the public key associated with the signed message and determine whether the public key has been previously used. Because the first message is the first message signed using the private key, monitor 140 can determine that the public key has not be previously used and add the public key to a list of previously used public keys.

In 325, receiver 120 can verify the signed message using the public key and, in the case of a cryptocurrency, determine whether sender 110 has sufficient funds to complete the transaction. If the signed message is verified and sender 110 has sufficient funds, receiver 120 can, in 326, transmit a first response to sender 110 (e.g., a confirmation of the transaction, an electronic product, an instruction to dispense a product if sender 110 is a vending machine, etc.).

In 327, receiver 120 can initiate the addition of the transaction to the transaction log (e.g., the block chain). Because the signed message is the only message signed using the private key and/or because sender 110 has sufficient funds, the transaction will eventually be successfully added to the transaction log.

In 330, sender 110 can enter into a second transaction with receiver 120 (e.g. a second purchase using a cryptocurrency), sign a second message corresponding to the transaction using the private key, and broadcast the signed message to all participants that maintain an instance of the transaction log (e.g. receiver 120 and monitor 140).

In 345, receiver 120 can verify the signed message using the public key and, in the case of a cryptocurrency, determine whether sender 110 has sufficient funds to complete the transaction. If the first transaction has not yet been added to the block chain, the funds from the first transaction would not yet have been removed from the account of sender 110. Accordingly, if the signed message is verified and sender 110 has sufficient funds prior to the first transaction, receiver 120 can, in 346, transmit a second response to sender 110 (e.g., a confirmation of the transaction, an electronic product, an instruction to dispense a product if sender 110 is a vending machine, etc.).

In 347, receiver 120 can initiate the addition of the transaction to the transaction log (e.g., the block chain). Because the signed message is the second message signed using the private key and/or because sender 110 no longer has sufficient funds after the first transaction, the transaction may not be successfully added to the transaction log and the receiver may not receive payment for the second transaction.

In 340, monitor 140 can determine the public key associated with the signed message and determine whether the public key has been previously used. Because the first message and the second message are signed using the private key, monitor 140 can determine that the public key has been used twice.

In response, in 350, monitor 140 can attempt to forge the signature of sender 110. Once the signature is forged, in 360, monitor 140 can execute a new transaction using the signature of sender 110. Monitor 140 can then initiate the addition of the transaction to the transaction log. Depending on transaction log processing, in some embodiments, the new transaction will be given preference to the first two transactions because the new transaction also has a valid signature. In such embodiments, the new transaction can supersede the first two transactions, such that the new transaction can be added to the transaction log but not the first two. Accordingly, the new transaction can overcome the attempt of sender 110 to spend twice by including payments to both receivers (and possibly monitor 140 and/or other parties).

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
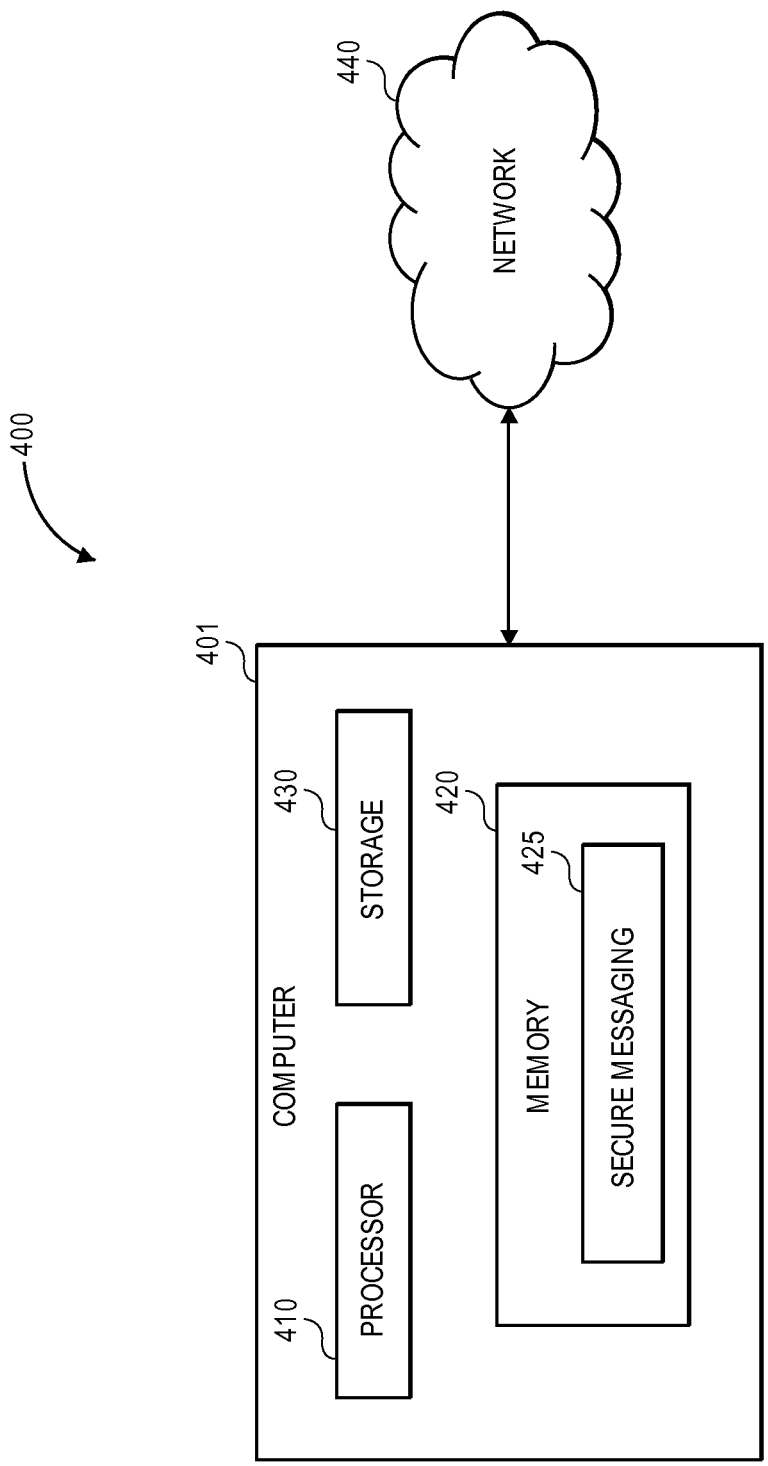
FIG. 4 is a diagram illustrating an example of a hardware system for detecting double signing in a one-time use signature scheme, consistent with certain disclosed embodiments.

FIG. 4 is a diagram illustrating an example of a hardware system 400 for detecting double signing in a one-time use signature scheme, consistent with certain disclosed embodiments. The example system 400 includes example system components that may be used. The components and arrangement, however, may be varied.

A computer 401 may include a processor 410, a memory 420, storage 430, and input/output (I/O) devices (not pictured). The computer 401 may be implemented in various ways and can be configured to perform any of the embodiments described above. For example, the computer 401 may be a general purpose computer configured to perform embodiments described above. In some embodiments, computer 401 can represent receiver 120 or monitor 140 and can be a general purpose computer of an end user that can receives messages signed using one-time use signature schemes, verifies the messages, and/or detects doubling signing of the messages. As an additional example, the computer 401 can be a specialized computer system specifically designed to mine a cryptocurrency and/or monitor for double signing. The computer 401 may be standalone or may be part of a subsystem, which may, in turn, be part of a larger system.

The processor 410 may include one or more known processing devices, such as a microprocessor from the Intel Core™ family manufactured by Intel™, the Phenom™ family manufactured by AMD™, or the like. Memory 420 may include one or more storage devices configured to store information and/or instructions used by processor 410 to perform certain functions and operations related to the disclosed embodiments. Storage 430 may include a volatile or non-volatile, magnetic, semiconductor, tape, optical, removable, non-removable, or other type of computer-readable medium used as a storage device. In some embodiments, storage 430 can include, for example, an instance of a distributed transaction database (e.g., a block chain).

In an embodiment, memory 420 may include one or more programs or subprograms including instructions that may be loaded from storage 430 or elsewhere that, when executed by computer 401, perform various procedures, operations, or processes consistent with disclosed embodiments. For example, memory 420 may include a secure messaging program 425 for receiving messages signed using one-time use signature schemes, verifying the messages, and/or detecting doubling signing of the messages, according to various disclosed embodiments. Memory 420 may also include other programs that perform other functions, operations, and processes, such as programs that provide communication support, Internet access, etc. The secure messaging program 425 may be embodied as a single program, or alternatively, may include multiple sub-programs that, when executed, operate together to perform the function of the secure messaging program 425 according to disclosed embodiments. In some embodiments, secure messaging program can perform all or part of the processes of FIG. 2, described above.

The computer 401 may communicate over a link with a network 440. For example, the link may be a direct communication link, a local area network (LAN), a wide area network (WAN), or other suitable connection. The network 440 may include the internet, as well as other networks, which may be connected to various systems and devices.

The computer 401 may include one or more input/output (I/O) devices (not pictured) that allow data to be received and/or transmitted by the computer 401. I/O devices may also include one or more digital and/or analog communication I/O devices that allow the computer 401 to communicate with other machines and devices. I/O devices may also include input devices such as a keyboard or a mouse, and may include output devices such as a display or a printer. The computer 401 may receive data from external machines and devices and output data to external machines and devices via I/O devices. The configuration and number of input and/or output devices incorporated in I/O devices may vary as appropriate for various embodiments.

Example uses of the system 400 can be described by way of example with reference to the example embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
a processing system of a device comprising one or more processors; and
a memory system comprising one or more computer-readable media, wherein the one or more computer-readable media contain instructions that, when executed by the processing system, cause the processing system to perform operations comprising:
receiving a message, wherein the message comprises a signature generated using a one-time use private key of a hash-based one-time use public/private key pair;
determining a one-time use public key of the hash-based one-time public/private key pair based on the message;
determining that the hash-based one-time use public/private key pair was used more than once by comparing the one-time use public key to a list of public keys associated with previously received messages, wherein the list of public keys is included in a first transaction database that maintains a first log of transactions;
generating an alert based on determining that the hash-based one-time use public/private key pair was used more than once; and
performing, based on the signature, one or more punitive operations in relation to a sender of the message, wherein the one or more punitive operations comprises forging a signature associated with the one-time use private key based on the message and a previous message of the previously received messages, wherein the previous message is signed using the one-time use private key.

2. The system of claim 1, wherein the signature is automatically forged in response to the alert.

3. The system of claim 1, wherein the message is associated with a cryptocurrency, and performing the one or more punitive operations further comprises initiating a transfer of funds from an account of the sender of the message using the forged signature.

4. The system of claim 3, wherein the funds are automatically transferred using the forged signature in response to the signature being successfully forged.

5. The system of claim 1, wherein performing the one or more punitive operations further comprises transmitting the alert to a mobile device to cause the mobile device to:
play an alert audio file,
turn on the screen of the mobile device, or
vibrate in response to the alert.

6. The system of claim 1, wherein the memory system further comprises a second transaction database.

7. The system of claim 1, wherein the hash-based one-time use public/private key pair is associated with at least one of a Lamport signature scheme, a generalized Bos-Chaum signature scheme, a Lamport-Diffie-Winternitz signature scheme, or a generalized Bos-Chaum-Winternitz signature scheme.

8. A computer-implemented method, comprising:
receiving a message, wherein the message comprises a signature generated using a one-time use private key of a hash-based one-time use public/private key pair;
determining a one-time use public key of the hash-based one-time public/private key pair based on the message;
determining that the hash-based one-time use public/private key pair was used more than once by comparing the one-time use public key to a list of public keys associated with previously received messages, wherein the list of public keys is included in a first transaction database that maintains a first log of transactions;
generating an alert based on determining that the hash-based one-time use public/private key pair was used more than once; and performing, based on the signature, one or more punitive operations in relation to a sender of the message, wherein the one or more punitive operations comprises forging a signature associated with the one-time use private key based on the message and a previous message of the previously received messages, wherein the previous message is signed using the one-time use private key.

9. The method of claim 8, wherein the signature is automatically forged in response to the alert.

10. The method of claim 8, wherein performing the one or more punitive operations further comprises initiating a transfer of funds from an account of the sender of the message using the forged signature.

11. The method of claim 10, wherein the funds are automatically transferred using the forged signature in response to the signature being successfully forged.

12. The method of claim 8, wherein performing the one or more punitive operations further comprises transmitting the alert to a mobile device to cause the mobile device to:
play an alert audio file,
turn on the screen of the mobile device, or
vibrate in response to the alert.

13. The method of claim 8, wherein the memory system further comprises a second transaction database.

14. The method of claim 8, wherein the hash-based one-time use public/private key pair is associated with at least one of a Lamport signature scheme, a generalized Bos-Chaum signature scheme, a Lamport-Diffie-Winternitz signature scheme, or a generalized Bos-Chaum-Winternitz signature scheme.

15. A non-transitory computer readable storage medium comprising instructions for causing one or more processors to:
receive a message, wherein the message comprises a signature generated using a one-time use private key of a hash-based one-time use public/private key pair;
determine a one-time use public key of the hash-based one-time public/private key pair based on the message;
determine that the hash-based one-time use public/private key pair was used more than once by comparing the one-time use public key to a list of public keys associated with previously received messages, wherein the list of public keys is included in a first transaction database that maintains a first log of transactions;
generate an alert based on determining that the hash-based one-time use public/private key pair was used more than once; and
perform, based on the signature, one or more punitive operations in relation to a sender of the message, wherein the one or more punitive operations comprises forging a signature associated with the one-time use private key based on the message and a previous message of the previously received messages, wherein the previous message is signed using the one-time use private key.

16. The non-transitory computer readable storage medium of claim 15, wherein the signature is automatically forged in response to the alert.

17. The non-transitory computer readable storage medium of claim 15, wherein the message is associated with a cryptocurrency, the instructions to perform the one or more punitive operations further comprises initiating a transfer of funds from an account of the sender of the message using the forged signature.

18. The non-transitory computer readable storage medium of claim 17, wherein the funds are automatically transferred using the forged signature in response to the signature being successfully forged.

19. The non-transitory computer readable storage medium of claim 15, wherein the instructions to perform the one or more punitive operations further comprises transmitting the alert to a mobile device to cause the mobile device to:
play an alert audio file,
turn on the screen of the mobile device, or
vibrate in response to the alert.

20. The non-transitory computer readable storage medium of claim 15, wherein the memory system further comprises an instance of a second transaction database.

21. The non-transitory computer readable storage medium of claim 15, wherein the hash-based one-time use public/private key pair is associated with at least one of a Lamport signature scheme, a generalized Bos-Chaum signature scheme, a Lamport-Diffie-Winternitz signature scheme, or a generalized Bos-Chaum-Winternitz signature scheme.

* * * * *